Patented June 29, 1926.

1,591,001

UNITED STATES PATENT OFFICE.

HENRY JOSEPH, OF PITTSBURGH, PENNSYLVANIA, ASSIGNOR TO UNITED STATES SAND PAPER COMPANY, OF WILLIAMSPORT, PENNSYLVANIA, A CORPORATION OF PENNSYLVANIA.

SHEET ABRASIVE MATERIAL.

No Drawing.  Application filed May 12, 1925. Serial No. 29,838. REISSUED

This invention relates to improvements in sandpaper, emery cloth, etc., and more particularly sandpaper or emery cloth made with a waterproof cement binder for the abrasive. The sandpaper or emery cloth of the present invention is not only waterproof but is also fireproof.

Sandpaper and emery cloth, when made with a waterproof cement, are inflammable and combustible. The inflammable character of the material adds to the fire hazard, not only during its manufacture, but also during its transportation and storage, and also during its use, where sparks resulting from its use may suffice to set fire to the inflammable material.

The present invention provides an improved sheet abrasive such as sandpaper or emery cloth, which is waterproof and also fireproof or incombustible in the sense that it is not readily inflammable and resists combustion.

According the the present invention, both the paper or cloth backing, and the waterproof cement used, are fireproofed, so that the resulting abrasive sheet is made up of both a fireproof backing and a fireproof and waterproof cement for the abrasive material.

The backing employed may be paper or cloth backing such as is now commonly employed in making sandpaper and emery cloth. It is specially treated, however, by a fireproofing treatment to make it fireproof or incombustible. The waterproof cement employed may be varied. It may be made, for example, of the usual varnish ingredients, such as oils, resins, etc., but there is added to the cement and compounded therewith, suitable fireproofing ingredients, so that the resulting waterproof cement is also fireproof and contains in its composition appropraite fireproofing ingredients.

Different fireproofing agents may be employed both for fireproofing the paper or cloth backing and for compounding with the waterproof cement. The paper or cloth backing may be treated or impregnated with a solution of the fireproofing agent or agents, or the fireproofing agent or agents may be used or incorporated into the paper or cloth, for example, during its manufacture, in order to render it fireproof. A saturated aqueous solution of ammonium sulfate is satisfactory for this purpose. The solution may be applied hot or cold to the paper or fabric, depending on how readily the paper or cloth absorbs the solution of fireproofing material. The paper or cloth may then be allowed to dry in the air or in a drying oven before the waterproof binder or cement is applied.

The waterproof adhesive or cement may be made from drying oils and gum and resins in the way varnishes are made, with the addition of driers or siccatives to hasten the drying or curing operation, and fireproofing materials are added and compounded therewith in such proportion as to render the adhesive or cement substantially fireproof when used in making the abrasive paper, cloth, or other desirable product.

The varnish oils, resins, driers, etc., commonly used in making waterproof varnish composition, are well known in the art, as well as the thinners or solvents, like turpentine, for thinning the composition to facilitate its application.

The fireproofing materials compounded with the waterproof adhesive may be organic or inorganic compounds which are of a suitable character to prevent burning of the product and to render it substantially fireproof particularly when employed in the composition in substantial amounts.

The invention will be further illustrated by the following specific example describing a flexible waterproof cement or adhesive which is also fireproof. In the formula given, the parts are by weight.

Blown linseed oil _____ 1400
Varnish gum (copal) _____ 1000
Manganese resinate _____ 30
Triphenyl phosphate _____ 400
Ammonium sulphate _____ 400

The actual mixing and compounding of the gum, oil, and drier may be done as in the manufacture of varnishes. The gum may be fused and heated until the required amount of distillation has occurred in order that the gum may compound readily with the oil. The heated oil may then be added in small portions at a time with stirring. The drier may be added to the heated oil, or the fused gum when ready to take the oil, or to the compounded resin and oil. The triphenyl phosphate may be added to the compounded resin, oil, and drier while still hot. After cooling to about 100° C., the finely powdered ammonium sulphate may be stirred into the compounded mixture. The resulting material may then be treated in a paint mill or other suitable apparatus to secure uniform distribution of the salt.

The viscous composition thus obtained may be used alone, or may be diluted with suitable solvents, to make satisfactory its workability in the manufacturing process.
This material, either with or without solvents, may be used for waterproofing the paper or cloth backing with a fire-proof cement, as well as for the adhesive coating for securing the abrasive to the cloth or paper. That is, the paper or fabric may be rendered waterproof, as well as fireproof, by the application to both sides thereof of the fireproof and waterproof composition, such as the composition above mentioned. So also, if the paper or fabric has previously been fireproofed by an independent treatment, it may be waterproofed on both sides with the fireproof and waterproof compositions, and the abrasive may be applied to one side or to both sides of the paper or fabric so treated. Where the abrasive is applied only to one side of the paper or fabric, the other side may be treated with a light waterproofing treatment sufficient to render it waterproof, and this waterproofing will be accomplished without sacrificing the desired fireproof character of the waterproof product.

In applying the cement or adhesive, a coat of the proper consistency, preferably heated to about 60° C., may be applied to one side of the paper or cloth. Abrasive grit may then be distributed thereon in any suitable manner, and excess or loose grit removed.
The paper or cloth may then be passed to another machine, or back through the same machine, and given a second or top coating of adhesive, in the manner customary, for example, in making sandpaper or emery cloth with the use of glue as an adhesive. For special purposes, the second coating may be dispensed with, but such second coatings are customary in the art.

Where the adhesive and abrasive are applied plied to only one side of the sheet, the other side may be waterproofed by treating with any suitable waterproofing material, but this waterproofing material, as above indicated, is advantageously one which contains fireproofing agents. A somewhat diluted mixture made, for example, by diluting the above composition with a solvent, or made by compounding a drying oil with suitable fireproofing material, may be used for this purpose. Such a waterproofing and fireproofing composition may be applied before or after the abrasive side is prepared. In some cases, the waterproof and fireproof compositions applied to the two sides of the paper or cloth may be sufficient to render it fireproof as well as waterproof, in which case a special preliminary treatment of the cloth or fabric backing to render it fireproof may be unnecessary, although, in general, it is advantageous to fireproof the cloth fabric independently and before the application thereto of the waterproof cement.

Instead of applying the cement and abrasive to only one side of the backing, they may be applied to both sides by supplying both sides with the adhesive and distributing grit by suitable means thereon. Where the sheet is coated on both sides with the abrasive, top coats of the cement may be applied to one or both sides, or, in some cases, such top coats may be omitted.

After the application of the waterproof cement and of the abrasive the sheet material is dried or cured, for example, by hanging it in the air or in a warm room or in an oven. The curing may thus be effective by hanging the sheet material in a room or oven heated to between 70° and 100° C., and by supplying warm air to hasten the drying and curing, e. g., by polymerization, oxidation, etc., of the adhesive and waterproofing materials.

In general, the method of applying the waterproof cement, by spreading it evenly over the paper or fabric, and by applying the powdered abrasive thereto (such as emery powder, glass powder, etc.) is similar to that commonly employed when using glue and other material as adhesive or cement, and the drying or curing of the cement may be carried out in the same way that varnish films or layers are commonly dried or cured to convert the varnish films into a waterproof film or coating.

The improved product of the present invention so obtained is a substantially waterproof and in addition a substantially fireproof abrasive sheet, with both the sheet backing and the waterproof cement, as well as the powdered abrasive material itself, fireproof or incombustible in the sense that they resist combustion and prevent burning of the product or render the material substantially fireproof.

Variations can be made in the amounts and proportions of the ingredients used, as well as in the ingredients themselves, and in the particular procedure employed in making the new composite fireproof and waterproof sheet abrasive without departing from the spirit and scope of the invention.

It will thus be seen that the invention provides a new and improved sheet abrasive which has the important advantage of being fire resistant or fireproof, and that the sheet abrasive is fireproofed both in the sheet backing and in the adhesive cement applied thereto. While the advantages of the invention are obtainable in part by fireproofing only the backing or the cement, the portion which is not fireproofed remains combustible, while by specially fireproofing both the backing and the adhesive, a composite product is obtained which is substantially fireproof or fire resistant throughout, even though it is made up of a cloth or paper backing and of a varnish composition which, without the fireproofing treatment or ingredient, would be of a readily combustible or inflammable nature. The present invention accordingly makes possible the utilization of ingredients which commonly give a readily combustible or inflammable product, but with the production instead of a substantially incombustible, or fireproof, or fire resistant product.

I claim:

1. A flexible sheet abrasive material comprising a flexible backing, an abrasive, and a stable and permanently flexible adhesive for securing said abrasive to said backing, which adhesive is fireproof and remains fireproof and retains its adhesive and flexible properties after being thoroughly wetted.

2. A flexible sheet abrasive material comprising a flexible backing, a fireproof abrasive, and a stable and permanently flexible adhesive for securing said abrasive to said backing, which adhesive is waterproof and fireproof and remains fireproof and retains its adhesive and flexible properties after being thoroughly wetted.

3. A flexible sheet abrasive material comprising a flexible fireproof and waterproof backing, a fireproof abrasive, and a stable and permanently flexible adhesive for securing said abrasive to said backing, which adhesive is waterproof and fireproof and remains fireproof after being thoroughly wetted.

4. Sheet abrasive material comprising sheet backing and a waterproof cement for the adhesive secured thereto, said cement containing triphenyl phosphate.

5. Sheet abrasive material comprising sheet backing and a waterproof cement for the adhesive secured thereto, said cement containing ammonium sulphate.

6. Sheet abrasive material comprising sheet backing and a waterproof cement for the adhesive secured thereto, said cement containing triphenyl phosphate and ammonium sulphate.

In testimony whereof I affix my signature.

HENRY JOSEPH.